(12) United States Patent
Palusa et al.

(10) Patent No.: US 6,476,666 B1
(45) Date of Patent: Nov. 5, 2002

(54) BOOTSTRAPPED CHARGE PUMP

(75) Inventors: Chaitanya Palusa, Santa Clara, CA (US); Abhijit Ray, Santa Clara, CA (US)

(73) Assignee: Alliance Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/873,017

(22) Filed: May 30, 2001

(51) Int. Cl.[7] .................................................. G05F 3/02
(52) U.S. Cl. ......................... 327/536; 327/589; 327/390
(58) Field of Search ................................. 327/536, 589, 327/390, 148, 157, 534, 537; 336/59, 60

(56) References Cited

U.S. PATENT DOCUMENTS 6,157,242 A * 12/2000 Fukui ........................... 327/536
6,172,886 B1 * 1/2001 Lauterbach et al. ........... 363/60

* cited by examiner

*Primary Examiner*—Tuan T. Lam
*Assistant Examiner*—Hiep Nguyen
(74) *Attorney, Agent, or Firm*—Stallman & Pollock LLP

(57) ABSTRACT

The diode drops associated with the output voltage from a conventional charge pump are eliminated in the present invention with a dual-chain charge pump that utilizes the pumped voltages from each charge pump chain to drive the gates of the other charge pump chain. As a result, the voltages on the gates of the transistors are pumped up to a level such that there is no threshold voltage drop across the transistor, and thus, making it behave like an ideal switch.

17 Claims, 9 Drawing Sheets

BOOTSTRAPPED CHARGE PUMP

BACKGROUND OF THE INVENTION

1. Field of the Invention

The present invention relates to charge pumps and, more particularly, to a cross-coupled, dual-chain charge pump, that is referred here as a bootstrapped charge pump.

2. Description of the Related Art

Historically, semiconductor devices that required voltages that were greater than the power supply voltage utilized dedicated pins to input the required voltages from an off-chip supply. Current-generation non-volatile memory devices, however, commonly use a charge pump, which utilizes the power supply voltage and ground, to generate the required voltages on the chip.

Thus, by utilizing a charge pump, dedicated pins are no longer required to input voltages from an off-chip supply that are greater than the power supply voltage. As a result, the total pin count of a device can be reduced accordingly. This is a significant advantage to current-generation chips that often have a limited number of pins available. Although charge pumps can provide the needed voltages from the power supply voltage and ground, charge pumps typically suffer from a low current drive (can source only a limited amount of current).

FIG. 1 shows a schematic diagram that illustrates a conventional charge pump 100. As shown in FIG. 1, charge pump 100 includes a number of stages SG1–SGn that are serially connected together to form a chain. Each stage SG in the chain progressively "pumps" or increases the voltage input to the stage to achieve the needed voltage.

Stages SG1–SGn include a corresponding number of input nodes NI1–NIn, output nodes NO1–NOn, and diode-connected n-channel transistors DN1–DNn. Each transistor DN has a gate and drain connected to an input node NI and a source connected to an output node NO. In addition, stages SG1–SGn also include a corresponding number of capacitors CAP1–CAPn, switching nodes NS1–NSn, and switches SW1–SWn. Each capacitor CAP is connected between an output node NO and a switching node NS. Each switch SW, in turn, is connected to a switching node NS, and either a power supply voltage VCC or ground, depending on the logic state of a clock signal.

As further shown in FIG. 1, first stage SG1 receives an input voltage VI such as the power supply voltage VCC, while last stage SGn outputs a pumped voltage VPM on output node NOn. The output node NO of each remaining stage is connected to the input node NI of the next stage SG in the chain.

In operation, the switch SW in each odd-numbered stage SG is controlled by a first clock signal PH1, while the switch SW in each even-numbered stage SG is controlled by a second clock signal PH2 that is 180° out-of-phase with the first clock signal PH1. For both clock signals PH1 and PH2, when the clock signal is asserted, the switch SW is connected to ground. On the other hand, when the clock signal is de-asserted, the switch is connected to the power supply voltage VCC.

Thus, when the first clock signal PH1 is asserted, first switch SW1 is connected to ground. In this condition, the gate-to-source voltage VGS of transistor DN1 is greater than the threshold voltage VTH1 of transistor DN1. As a result, transistor DN1 turns on and a current flows from the input node NI1 to the output node NO1 until the voltage VO on output node NO1 rises to a value that is a threshold voltage drop less than the power supply voltage VCC.

When the voltage VO on output node NO1 is a threshold voltage drop less than the power supply voltage VCC (VO=VCC−VTH1), transistor DN1 turns off as transistor DN1 conducts only as long as the gate-to-source voltage VGS is greater than the threshold voltage VTH1. As a result, the voltage across capacitor CAP1 is also equal to VCC−VTH1.

When the first clock signal PH1 is de-asserted, switch SW1 of the first stage SG1 is connected to the power supply voltage VCC. Since transistor DN1 is turned off, thereby isolating output node NO1 from the input node NI1, the power supply voltage VCC on switching node SW1 also appears on output node NO1 due to the principle of charge neutrality. As a result, the voltage VO1 on the output node NO1 is defined in equation EQ. 1 as:

$$VO1 = VCC - VTH1 + VCC = 2VCC - VTH1. \qquad \text{EQ. 1}$$

Thus, the voltage VO1 on output node NO1 is greater by the power supply voltage VCC when the first clock signal PH1 is de-asserted.

At the same time that the first clock signal PH1 is de-asserted, the second clock signal PH2 is asserted which, in turn, causes switch SW2 to be connected to ground. As with transistor DN1, transistor DN2 turns on until the voltage VO2 on output node NO2 is a threshold voltage drop less than the voltage on input node NI2/output node NO1.

The voltage VO2 on output node NO2 takes several clock cycles to reach 2VCC−VTH1−VTH2. This is because, unlike transistor DN1 where the current is delivered from the power supply voltage VCC, the current flowing into the output node NO2 from input node NI2/output node NO1 reduces the voltage on input node NI2/output node NO1, and thus, additional cycles are needed for the nodes to reach their full potentials.

When the second clock signal PH2 is de-asserted, switch SW2 is connected to the power supply voltage VCC which, in turn, causes the voltage VO2 on output node NO2 to be increased by the power supply voltage VCC. This process continues as described above. Thus, charge pump 100 shifts electrons from the output node NO to the input node NI of each stage SG until the pumped voltage VPM on output node NOn is equal to:

$$VPM = n(VCC) - (VTH1 + VTH2 + \ldots + VTHn). \qquad \text{EQ. 2}$$

(The pumped voltage VPM is actually slightly less due to the body effect of the transistors DN in each stage SG.)

One disadvantage of charge pump 100 is that the pump voltage VPM is reduced by the combined threshold voltage drops (VTH1+VTH2+ . . . +VTHn). The transistors in the charge pump, being configured as diodes, do not act as ideal switches, as in the case of an ideal charge pump. Further, the drive strength of the pump is greatly reduced when current is drawn from the pump. In some cases, an additional stage SG may need to be added to compensate for this loss, thereby increasing the size and cost of the charge pump. Thus, there is a need for a charge pump that outputs a pumped voltage VPM that is not reduced by the accumulated threshold voltage drops.

SUMMARY OF THE INVENTION

The charge pump of the present invention outputs a pumped voltage that is not reduced by the accumulated threshold voltage drops by utilizing a dual-chain charge pump where the pumped voltages from each charge pump chain drive the gates of the other charge pump chain. As a result, the voltages on the gates of the transistors are pumped up to be at least one diode drop greater than the voltages on the drains of the n-channel transistors, and one diode drop less than the voltages on the sources of the p-channel transistors.

In the charge pump of the present invention, the diode drops associated with the transistors are eliminated as a result of the pumped voltages on the drains/sources of the transistors of each pump that gets coupled to the gates of the transistors of the other pump. This makes the transistors act as ideal switches, and thus, enables the voltages on the sources/drains of the transistors to reach their full potentials, without being limited by their threshold voltages. Thus, this cross-coupled charge pump exhibits a bootstrapping phenomena, as the sources/drains are bootstrapped to reach their full potentials. Hence, the charge pump of the present invention is referred to as a bootstrapped charge pump.

A charge pump stage in accordance with the present invention includes a bottom transistor and a top transistor. The bottom transistor has a first node, a gate, and a second node. The top transistor has a third node, a gate connected to the second node of the bottom transistor, and a second node connected to the gate of the bottom transistor.

The charge pump stage also includes a bottom capacitor that is connected between the second node of the bottom transistor and a first clock signal, and a top capacitor that is connected between the second node of the top transistor and a second clock signal. The second clock signal is out-of-phase and non-overlapping with the first clock signal.

A charge pump in accordance with the present invention includes a plurality of stages that are connected together in series. Each stage has a bottom transistor and a top transistor. The bottom transistor has a first node, a gate, and a second node, while the top transistor has a first node, a gate connected to the second node of the bottom transistor, and a second node connected to the gate of the bottom transistor.

Each stage also has a bottom capacitor that is connected between the second node of the bottom transistor and either a first clock signal or a second clock signal. The first clock signal is connected when a stage is an odd-numbered stage, while the second clock signal is connected when a stage is an even-numbered stage.

Each stage further has a top capacitor that is connected between the second node of the top transistor and either the first clock signal or the second clock signal. The first clock signal is connected when a stage is an even-numbered stage, while the second clock signal is connected when a stage is an odd-numbered stage. The second clock signal is out-of-phase and non-overlapping with the first clock signal.

The plurality of stages are connected together so that, excluding a last stage, the second nodes of the bottom and top transistors in each stage are connected to the first nodes of the bottom and top transistors, respectively, in an adjacent stage, and so that, excluding a first stage, the first nodes of the bottom and top transistors in each stage are connected to the second nodes of the bottom and top transistors, respectively, in an adjacent stage.

A better understanding of the features and advantages of the present invention will be obtained by reference to the following detailed description and accompanying drawings which set forth an illustrative embodiment in which the principles of the invention are utilized.

DETAILED DESCRIPTION

Figure 1:
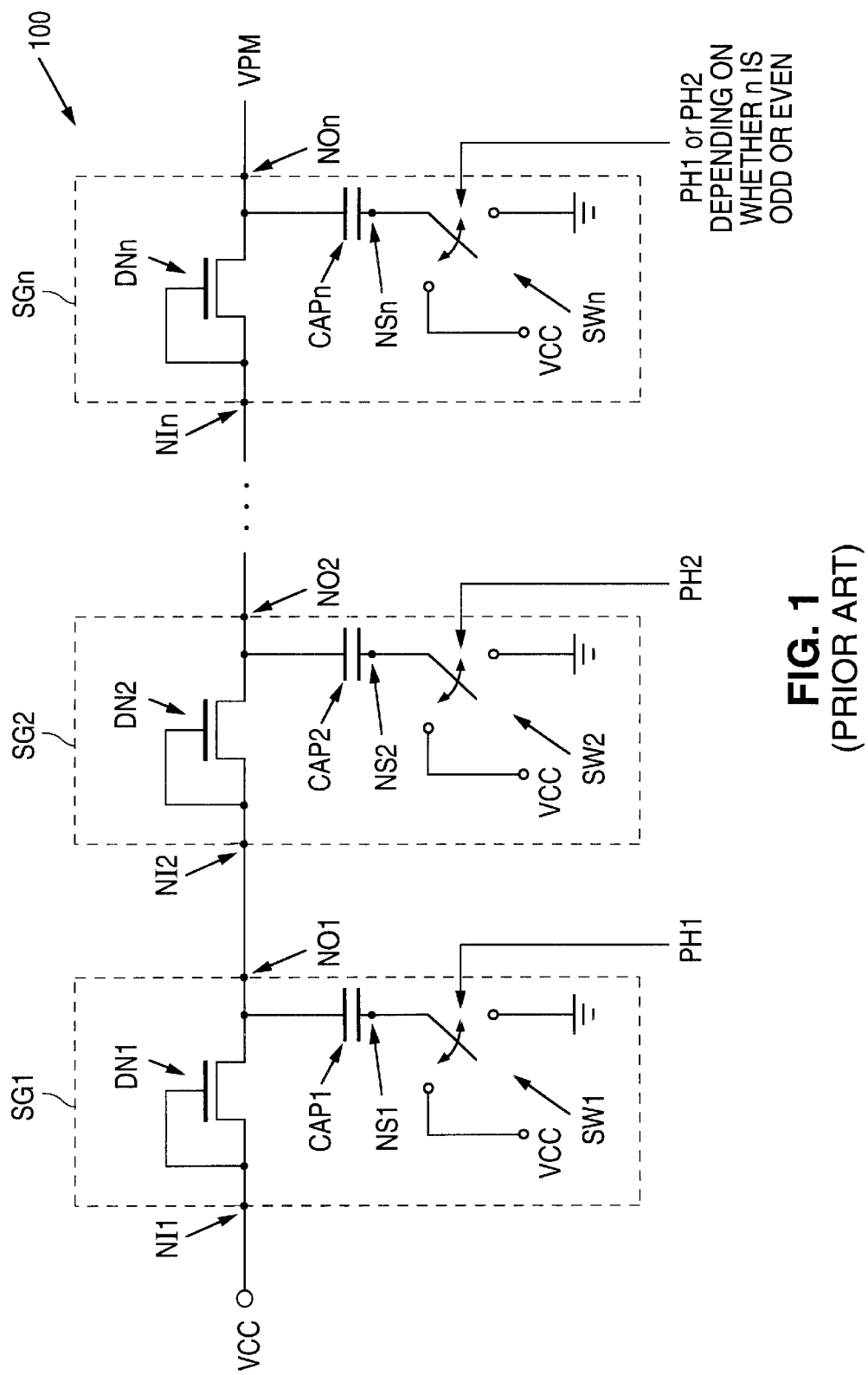
FIG. 1 is a schematic diagram illustrating a conventional charge pump 100.
Figure 2:
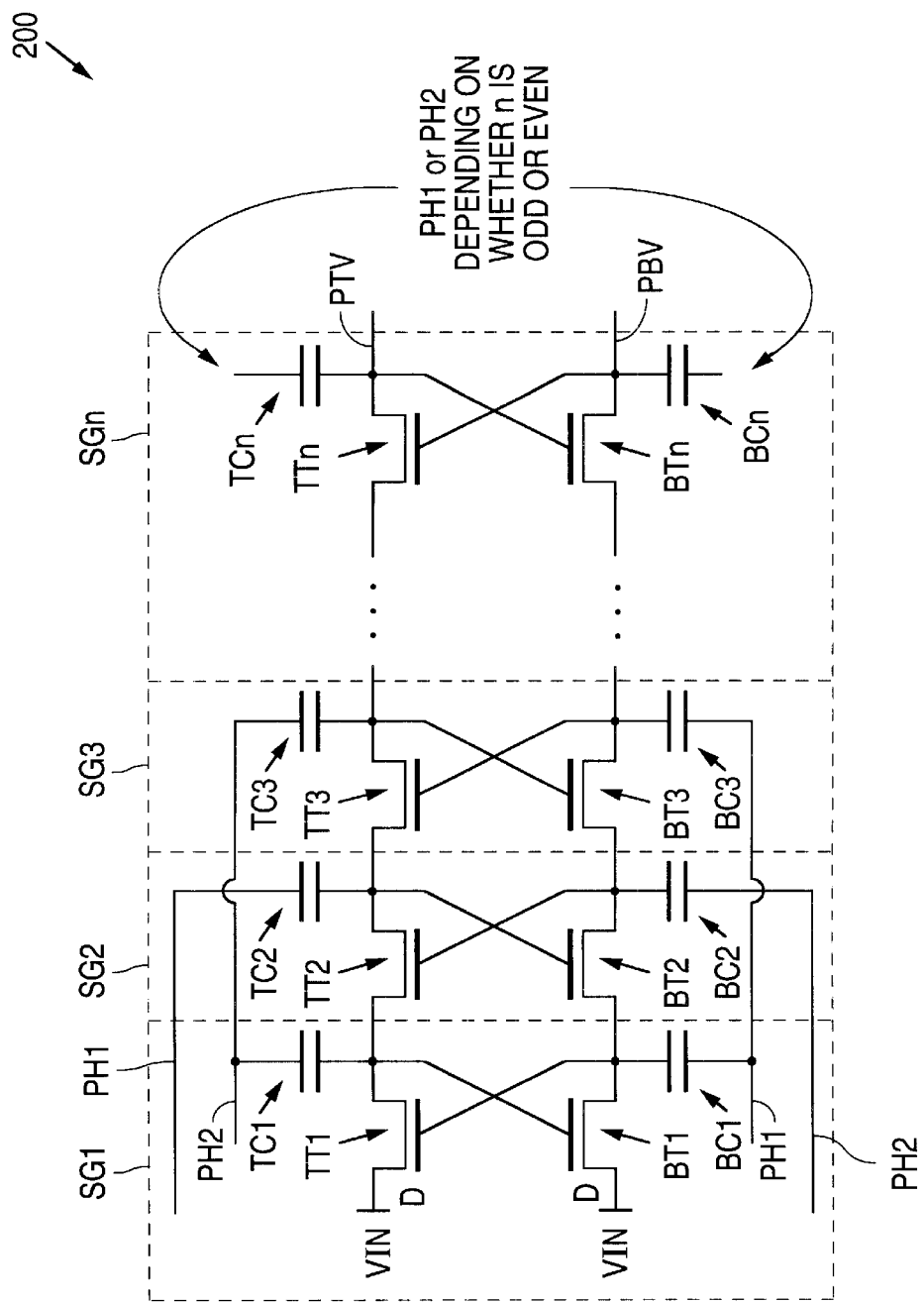
FIG. 2 is a schematic diagram illustrating a charge pump 200 in accordance with the present invention.

FIG. 2 shows a schematic diagram that illustrates a charge pump 200 in accordance with the present invention. As shown in FIG. 2, charge pump 200 includes a number of stages SG1–SGn that are serially connected together to form a chain. The stages SG1–SGn have a number of bottom transistors BT1–BTn and a corresponding number of top transistors TT1–TTn. Each bottom transistor BT in a stage SG has a drain, a gate, and a source. Each top transistor TT in the stage SG has a drain, a gate connected to the source of the bottom transistor BT, and a source connected to the gate of the bottom transistor BT.

The stages SG1–SGn also have a number of bottom capacitors BC1–BCn and a corresponding number of top capacitors TC1–TCn. Each bottom capacitor BC in a stage SG is connected between the source of a bottom transistor BT and either a first clock signal PH1 or a second clock signal PH2. The first clock signal PH1 is utilized when the stage SG is an odd-numbered stage, while the second clock signal PH2 is utilized when the stage SG is an even-numbered stage.

In addition, each top capacitor TC in a stage SG is connected between the source of the top transistor TT and either the first clock signal PH1 or the second clock signal PH2. The first clock signal PH1 is utilized when the stage SG is an even-numbered stage, while the second clock signal PH2 is utilized when the stage SG is an odd-numbered stage.

The second clock signal PH2 is out-of-phase and non-overlapping with the first clock signal PH1. In addition, both clock signals PH1 and PH2 alternate between a logic high voltage level such as the power supply voltage VCC, and a logic low voltage level such as ground (the logic low level can also be negative).

Stages SG1–SGn are connected together so that, with the exception of the last stage SGn, the sources of the bottom and top transistors BT and TT in each stage SG are connected to the drains of the bottom and top transistors BT and TT, respectively, in an adjacent stage SG. In addition, the drains of both the bottom and top transistors BT1 and TT1 in the first stage SG1 are connected to receive the input voltage VIN (such as the power supply voltage VCC). Further, the sources of the bottom and top transistors BTn and TTn in the last stage SGn output a pumped bottom voltage PBV, and a pumped top voltage PTV, respectively.

The operation of charge pump 200 is illustrated with a two-stage charge pump. When the clock signal PH1 falls to the logic low voltage level, a logic low potential approximately equal to the logic low voltage level is capacitively coupled to the source of bottom transistor BT1. Due to the cross coupling, the logic low potential is also coupled to the gate of top transistor TT1. When the clock signal PH2 rises to the logic high voltage level, a logic high potential approximately equal to the logic high voltage level is capacitively coupled to the source of top transistor TT1, and to the gate of bottom transistor BT1.

In this condition, the gate-to-source voltage of bottom transistor BT1 is greater than its threshold voltage. As a result, bottom transistor BT1 turns on and the voltage on the source of bottom transistor BT1 rises to a value that is equal to the logic high potential less the threshold voltage of bottom transistor BT1. The gate-to-source voltage of top transistor TT1, on the other hand, is less than its threshold voltage. As a result, top transistor TT1 is turned off.

When the clock signal PH2 switches back to the logic low voltage level from the logic high voltage level, the logic low potential is capacitively coupled to the source of top transistor TT1. Due to the cross coupling, the logic low potential is also coupled to the gate of bottom transistor BT1. When the clock signal PH1 rises to the logic high voltage level, the logic high potential is capacitively coupled to the source of bottom transistor BT1.

However, since a voltage equal to the logic high potential less the threshold voltage of bottom transistor BT1 is already on the source of bottom transistor BT1, the capacitively coupled logic high potential raises the potential on the source of bottom transistor BT1. The potential is raised by the difference between the logic low potential and the logic high potential to a potential equal to twice the logic high potential less the threshold voltage of bottom transistor BT1.

Due to the cross coupling, this same potential, which is more than one threshold voltage drop greater than the voltage on the drain of top transistor TT1, also sits on the gate of top transistor TT1. Thus, the voltage on the source of top transistor TT1 rises to the input voltage VIN.

When the clock signal PH1 switches back to the logic low voltage level from the logic high level, the logic low potential is capacitively coupled to the source of bottom transistor BT1. This reduces the potential on the source from twice the logic high potential less the threshold voltage of the bottom transistor to a single logic high potential less the threshold voltage of the bottom transistor. Due to the cross coupling, the same potential also sits on the gate of top transistor TT1.

When the clock signal PH2 again rises to the logic high voltage level, the logic high potential is capacitively coupled to the source of top transistor TT1. However, since a voltage equal to the input voltage VIN is already on the source of top transistor TT1, the capacitively coupled logic high potential raises the potential on the source of top transistor TT1. The potential is raised by the value of the logic high potential so that a potential equal to the input voltage plus the logic high potential is on the source of top transistor TT1.

Due to the cross coupling, this same potential, which is more than one threshold voltage drop greater than the voltage on the drain of bottom transistor BT1, also sits on the gate of bottom transistor BT1. Thus, the voltage on the source of bottom transistor BT1 rises to the input voltage VIN.

Thus, as the first clock signal PH1 switches between the logic low voltage level and the logic high voltage level, the potential on the source of bottom transistor BT1 switches between the input voltage VIN and the input voltage VIN plus the logic high potential. Similarly, as the second clock signal PH2 switches between the logic low voltage level and the logic high voltage level, the potential on the source of top transistor TT1 switches between the input voltage VIN and the input voltage VIN plus the logic high potential. Since the logic high potential is approximately equal to the input voltage VIN, the potentials on the sources of the bottom and top transistors of stage SG1 roughly swing between VIN and 2VIN. Thus, in accordance with the present invention, charge pump 200 provides pumped voltages that are not reduced by the threshold voltages of the pumping transistors.

When stage SG2 is added, the adjoining bottom transistors are switched on and off out-of-phase so that when one transistor is on, the adjoining transistors are off. This allows the highest potential from stage SG1 to become the lowest potential of stage SG2. Thus, the final predischarge potential on the source of bottom transistor BT2 in stage SG2 switches between the highest potential that is on the source of bottom transistor BT1, and this potential plus the logic high potential.

Similarly, the adjoining top transistors are switched on and off out-of-phase so that when one transistor is on, the adjoining transistors are off. This allows the highest potential from stage SG1 to become the lowest potential of stage SG2. Thus, the final predischarge potential on the source of top transistor TT2 in stage SG2 switches between the highest potential that is on the source of top transistor TT1, and this potential plus the logic high potential. Since the logic high potential is approximately equal to the input voltage VIN, the potentials on the sources of the bottom and top transistors of stage SG2 roughly swing between 2VIN and 3VIN.

Thus, for n stages, the final potential on the source of the bottom transistor of the nth stage switches between the input voltage VIN plus n−1 times the logic high potential; and the input voltage VIN plus n times the logic high potential. Similarly, the final potential on the source of the top transistor of the nth stage switches between the input voltage VIN plus n−1 times the logic high potential; and the input voltage VIN plus n times the logic high potential.

When additional stages are utilized, it takes a number of clock cycles before the sources of the bottom and top transistors BTn and TTn in the last stage SGn reach their final predischarge potentials. With the bottom and top transistors BT1 and TT1 in the first stage SG1, the currents to the sources are delivered by the power supply voltages VCC on the drains.

However, the drains of the top and bottom transistors of an additional stage SG, which are otherwise electrically isolated, are able to conduct a part of the currents to the sources of the additional stage as long as the increasing source potential does not turn off the transistor. Thus, it takes a number of clock cycles to shift or pump the charge to the sources of the transistors in the last stage SGn from the input voltage VIN connected to the drains on the transistors in the first stage SG1. The larger the difference between the logic low voltage level and the logic high voltage level, the greater the amount of charge that can be pumped each cycle.

Figure 3:
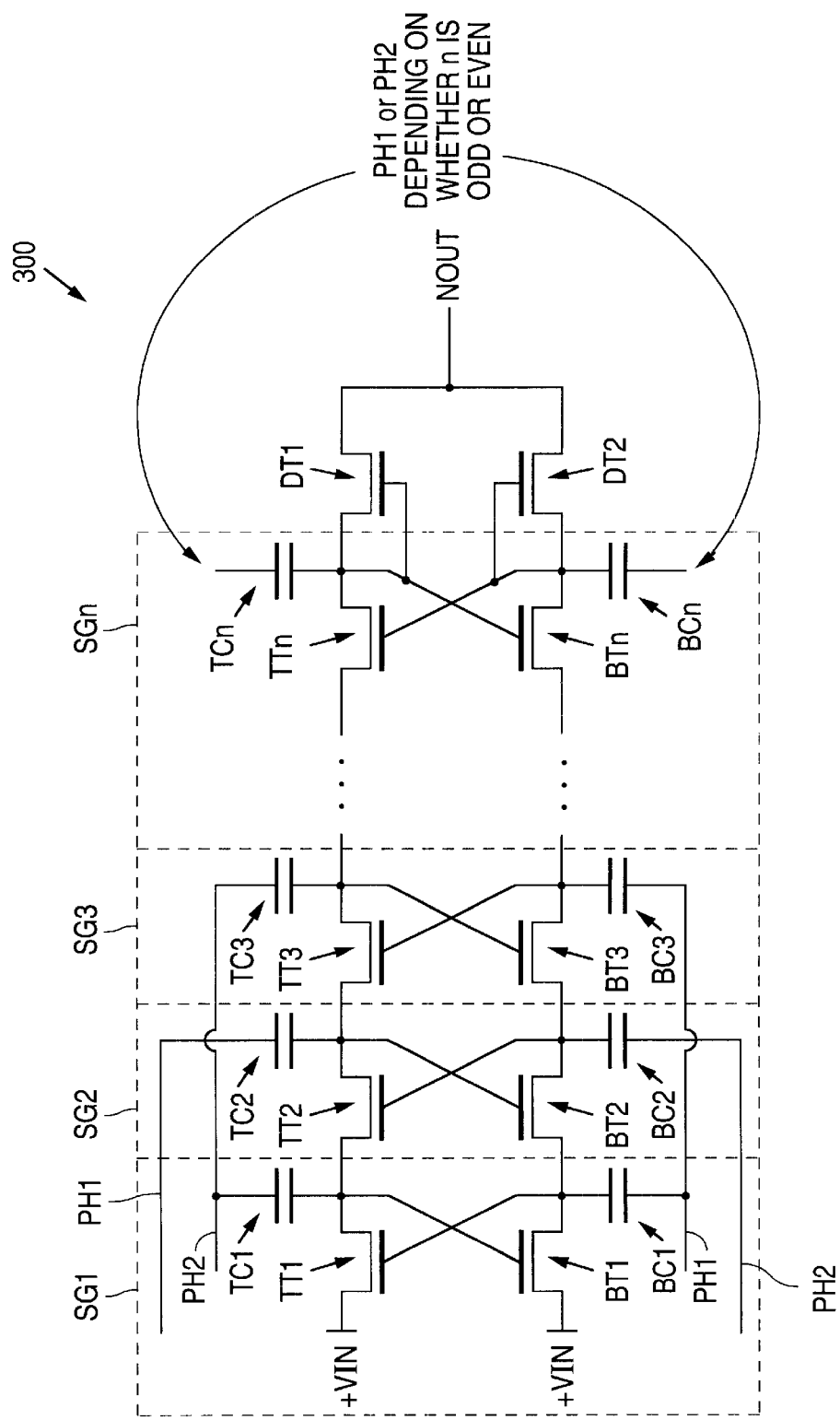
FIG. 3 is a schematic diagram illustrating a charge pump 300 in accordance with the present invention.

FIG. 3 shows a schematic diagram that illustrates a charge pump 300 in accordance with the present invention. Charge pump 300 is similar to charge pump 200 and, as a result, utilizes the same reference numerals to designate the structures that are common to both pumps.

As shown in FIG. 3, pump 300 differs from pump 200 in that pump 300 includes a first diode-connected transistor DT1 and a second diode-connected transistor DT2. Transistor DT1 has a drain and a gate connected to the source of the top transistor TTn in the last stage SGn, and a source connected to an output node NOUT. Transistor DT2 has a drain and a gate connected to the source of the bottom transistor BTn in the last stage SGn, and a source connected to the output node NOUT.

In operation, the voltage on the source of transistor DT1 has an approximately square waveform that switches between first and second voltages. The first voltage is equal to the input voltage VIN plus n–1 times the logic high potential less the threshold voltage of transistor DT1. The second voltage is equal to the input voltage VIN plus n times the logic high potential less the threshold voltage of transistor DT1.

Similarly, the voltage on the source of transistor DT2 has an approximately square waveform that switches between first and second voltages. The first voltage being equal to the input voltage VIN plus n–1 times the logic high potential less the threshold voltage of transistor DT2. The second voltage being equal to the input voltage VIN plus n times the logic high potential less the threshold voltage of transistor DT2.

The voltages on the sources of transistors DT1 and DT2 are 180° out-of-phase such that the first voltage on the source of transistor DT1 and the second voltage on the source of transistor DT2 are present at the same time. As a result, an approximately constant voltage equal to the input voltage VIN plus n times the logic high potential less the threshold voltage of transistor DT1 (the threshold voltages of transistors DT1 and DT2 are assumed to be the same) is present on the output node NOUT.

Figure 4:
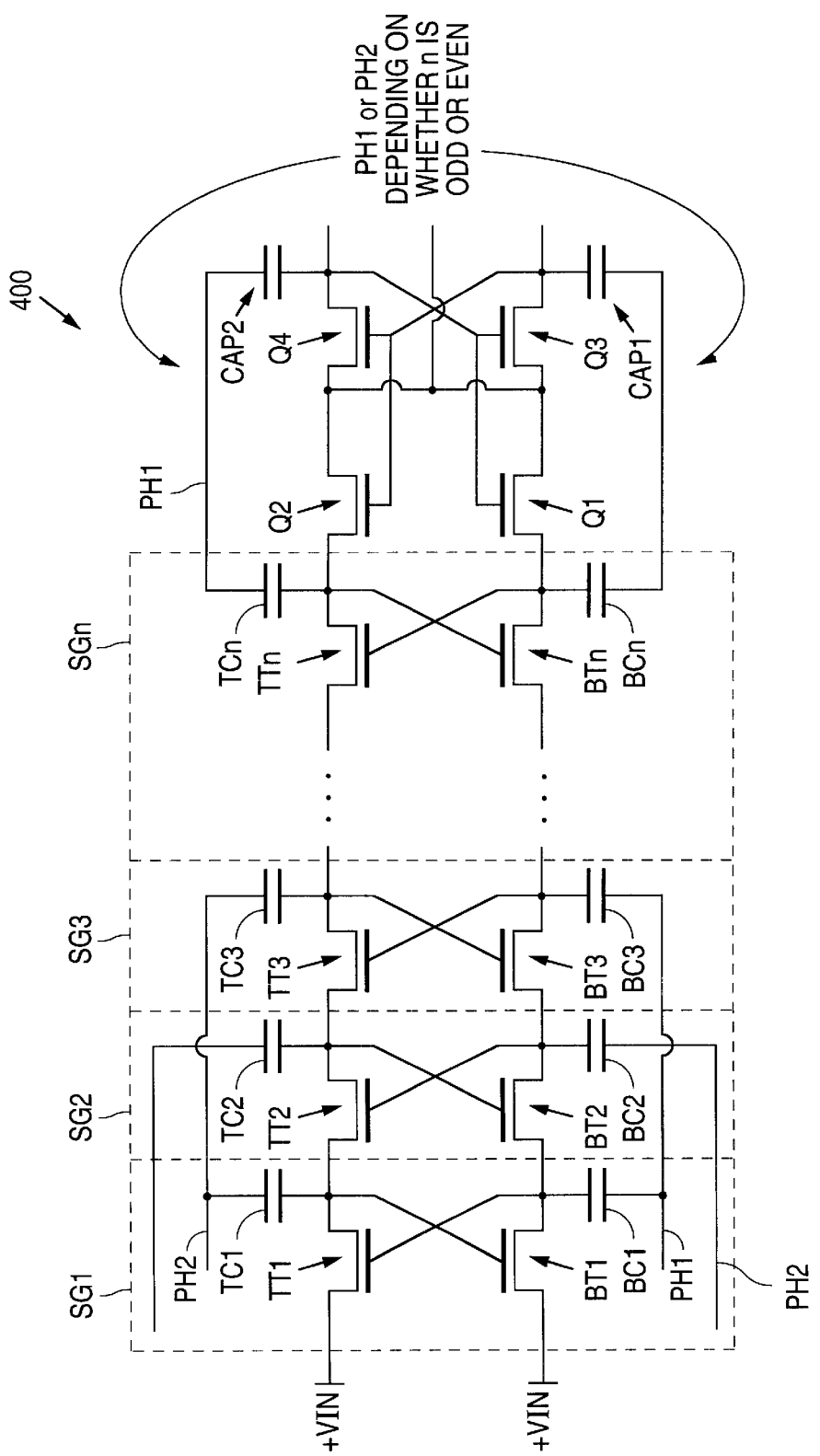
FIG. 4 is a schematic diagram illustrating a charge pump 400 in accordance with the present invention.

FIG. 4 shows a schematic diagram that illustrates a charge pump 400 in accordance with the present invention. Charge pump 400 is similar to charge pump 200 and, as a result, utilizes the same reference numerals to designate the structures that are common to both pumps.

As shown in FIG. 4, pump 400 differs from pump 200 in that pump 400 includes an n-channel first transistor Q1 and an n-channel second transistor Q2. First transistor Q1 has a drain connected to the source of the bottom transistor BTn in the last stage SGn, a gate, and a source connected to an output node NOUT. Second transistor Q2 has a drain connected to the source of the top transistor TTn in the last stage SGn, a gate, and a source connected to the output node NOUT.

Pump 400 also includes an n-channel third transistor Q3 and an n-channel fourth transistor Q4. Third transistor Q3 has a drain connected to the source of transistor Q1 and the output node NOUT, a gate connected to the gate of transistor Q1, and a source. Fourth transistor Q4 has a drain connected to the source of transistor Q2 and the output node NOUT, a gate connected to the gate of transistor Q2 and the source of transistor Q3, and a source connected to the gate of transistor Q3.

Pump 400 additionally includes a bottom capacitor CAP1 and a top capacitor CAP2. Bottom capacitor CAP1 is connected between the source of transistor Q3 and the clock signal that is the same as the clock signal that is connected to the top capacitor TCn in the last stage SGn. Top capacitor CAP2 is connected between the source of transistor Q4 and the clock signal that is the same as the clock signal that is connected to the bottom capacitor BCn in the last stage SGn. Bottom and top capacitors CAP1 and CAP2 can be, for example, about one-tenth as large as the bottom and top capacitors BC and TC.

In operation, the voltages on the sources of transistors Q3 and Q4 are pumped up in the same way as if transistors Q3 and Q4 were the bottom and top transistors BT and TT of another stage SG. As noted above, for n stages, the final potential on the source of the bottom transistor BTn of the nth stage switches between the input voltage VIN plus n–1 times the logic high potential; and the input voltage VIN plus n times the logic high potential. Similarly, the final potential on the source of the top transistor TTn of the nth stage switches between the input voltage VIN plus n–1 times the logic high potential; and the input voltage VIN plus n times the logic high potential.

Thus, the final potentials on the sources of transistors Q3 and Q4 switch between the input voltage VIN plus n times the logic high potential; and the input voltage VIN plus n+1 times the logic high potential. As a result, the highest final potentials on the sources of transistors Q3 and Q4 are both one logic high potential greater than the highest final potentials on the sources of the bottom and top transistors BTn and TTn of the last stage SGn.

Due to the cross coupling, when the potential on the source of the bottom transistor BTn of the last stage SGn switches to its highest potential, the voltage on the gates of transistors Q1 and Q3 also switches to its highest potential. This, in turn, causes the potential on the output node NOUT to rise to the highest potential that is on the source of the bottom transistor BTn of the last stage SGn.

Similarly, when the potential on the source of the top transistor TTn of the last stage SGn switches to its highest potential, the voltage on the gates of transistors Q2 and Q4 also switches to its highest potential. This, in turn, causes the potential on the output node NOUT to rise to the highest potential that is on the source of the top transistor TTn of the last stage SGn.

The voltage on the source of transistor Q1 has an approximately square waveform that switches between first and second voltages. The first voltage is equal to the input voltage VIN plus n–1 times the logic high potential. The second voltage is equal to the input voltage VIN plus n times the logic high potential.

Similarly, the voltage on the source of transistor Q2 has an approximately square waveform that switches between first and second voltages. The first voltage being equal to the input voltage VIN plus n–1 times the logic high potential. The second voltage being equal to the input voltage VIN plus n times the logic high potential.

The voltages on the sources of transistors Q1 and Q2 are 180° out-of-phase such that the first voltage on the source of transistor Q1 and the second voltage on the source of transistor Q2 are present at the same time. As a result, an approximately constant voltage equal to the input voltage VIN plus n times the logic high potential is present on the output node NOUT. Thus, charge pump 400 eliminates the threshold voltage drop associated with the voltage output from charge pump 300.

Figure 5:
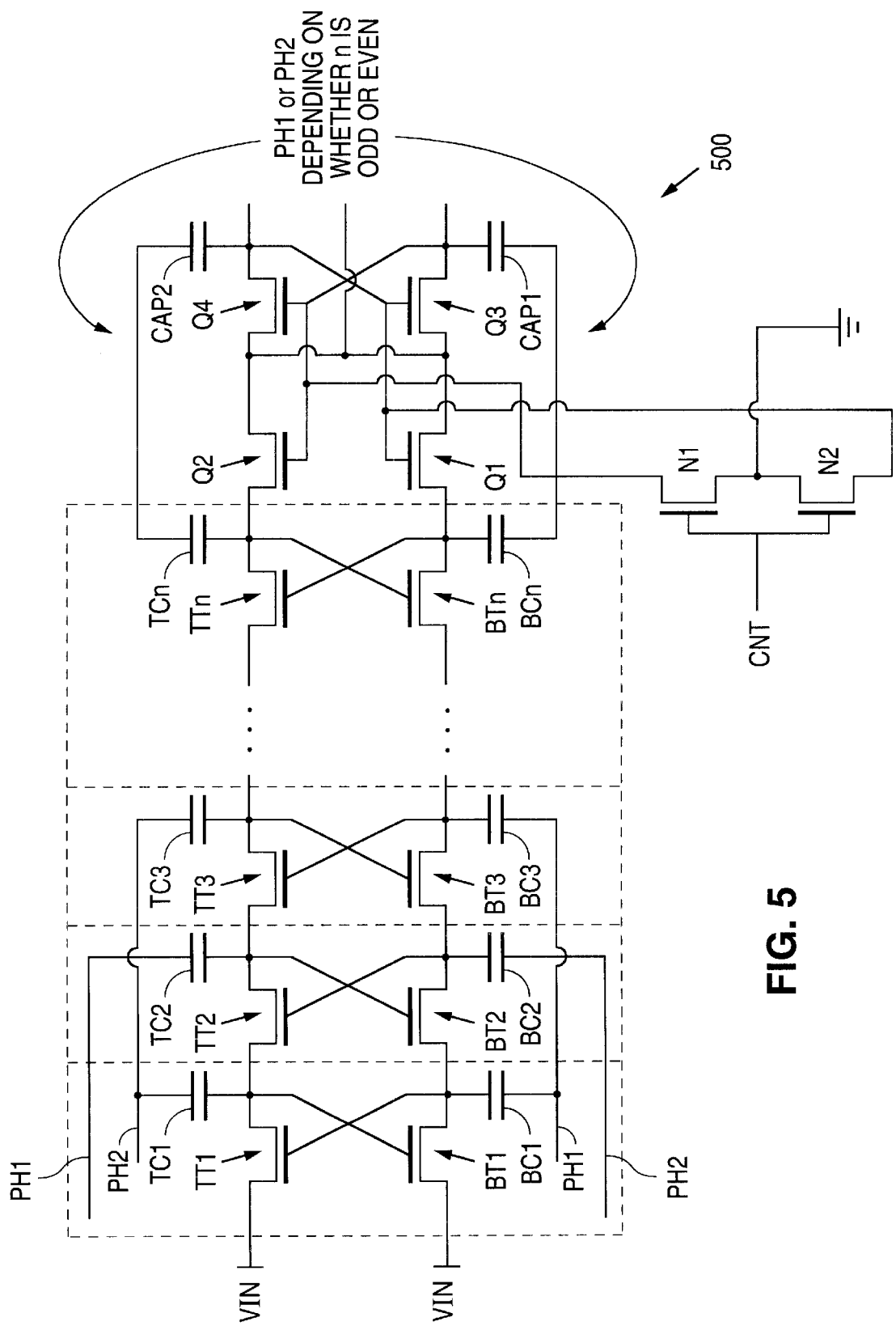
FIG. 5 is a schematic diagram illustrating a charge pump 500 in accordance with the present invention.

FIG. 5 shows a schematic diagram that illustrates a charge pump 500 in accordance with the present invention. Charge pump 500 is similar to charge pump 400 and, as a result, utilizes the same reference numerals to designate the structures that are common to both pumps.

As shown in FIG. 5, pump 500 differs from pump 400 in that pump 500 includes a pair of n-channel transistors N1 and N2 that are used to enable or disable pump 500. Transistor N1 has a drain connected to the gate of transistor Q2, a gate connected to receive a control signal CNT, and a source connected to ground. Transistor N2 has a drain connected to the gate of transistor Q1, a gate connected to receive the control signal CNT, and a source connected to ground. In operation, when the control signal CNT is low, the gates of the transistors Q1–Q4 are unaffected by transistors N1 and N2, and thus enabling the pump to operate normally. However, when the control signal CNT is high, the gates of transistors Q1–Q4 are pulled to ground, thereby turning transistors Q1–Q4, and as a result, the whole pump off.

Figure 6:
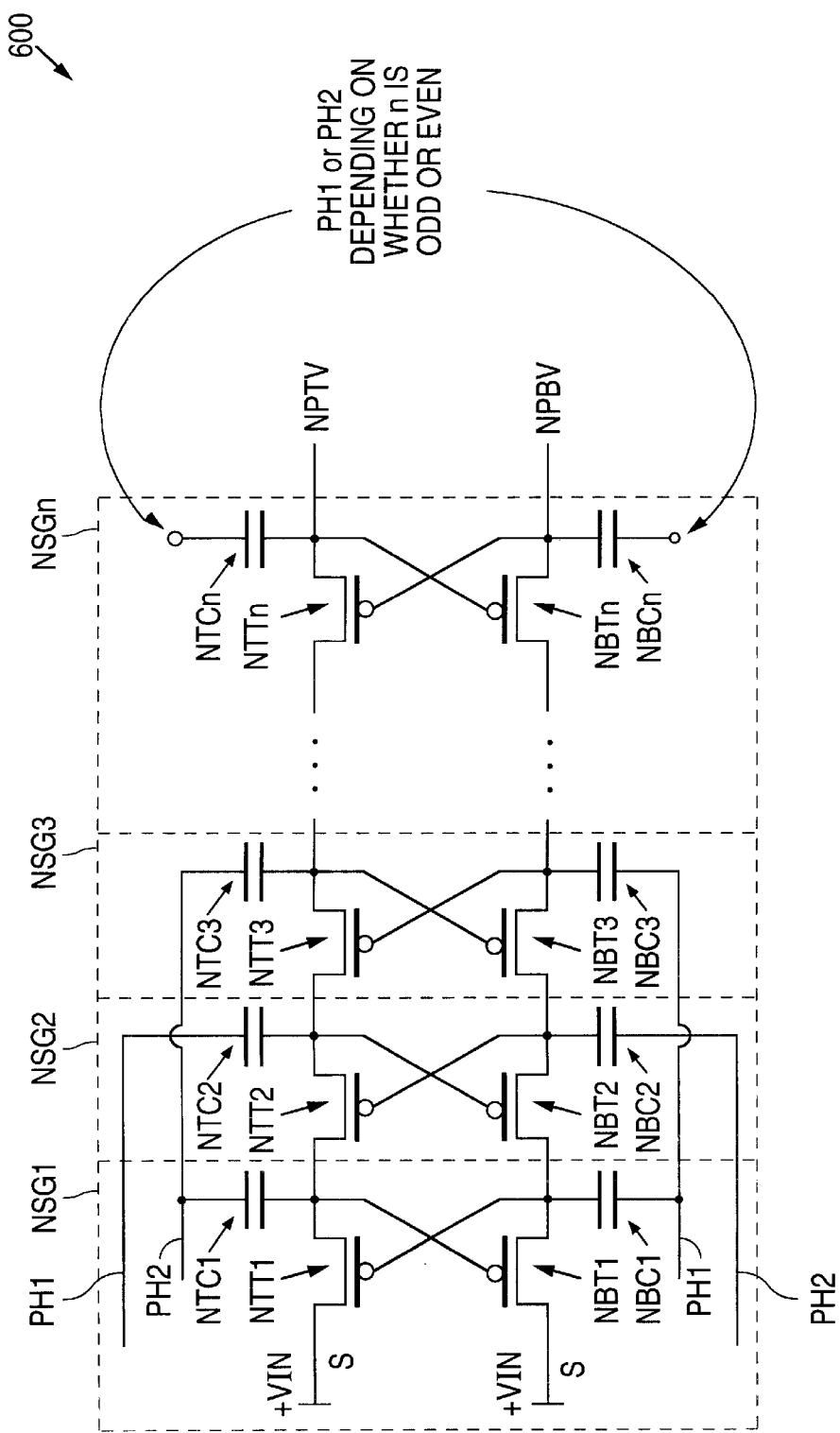
FIG. 6 is a schematic diagram illustrating a charge pump 600 in accordance with the present invention.

The present invention can also be utilized to pump negative voltages from a supply voltage by exchanging p-channel transistors for the n-channel transistors. FIG. 6 shows a schematic diagram that illustrates a charge pump stage 600 in accordance with the present invention.

As shown in FIG. 6, charge pump 600 includes a number of stages NSG1–NSGn that are serially connected together to form a chain. The stages NSG1–NSGn have a number of bottom transistors NBT1–NBTn and a corresponding number of top transistors NTT1–NTTn. Each bottom transistor NBT in a stage NSG has a drain, a gate, and a source. Each top transistor NTT in the stage NSG has a source, a gate connected to the drain of the bottom transistor NBT, and a drain connected to the gate of the bottom transistor NBT.

The stages NSG1–NSGn also have a number of bottom capacitors NBC1–NBCn and a corresponding number of top capacitors NTC1–NTCn. Each bottom capacitor NBC in a stage NSG is connected between the drain of a bottom transistor NBT and either the first clock signal PH1 or the second clock signal PH2. The first clock signal PH1 is utilized when the stage NSG is an odd-numbered stage, while the second clock signal PH2 is utilized when the stage NSG is an even-numbered stage. In addition, each top capacitor NTC in a stage NSG is connected between the source of the top transistor NTT and either the first clock signal PH1 or the second clock signal PH2. The first clock signal PH1 is utilized when the stage NSG is an even-numbered stage, while the second clock signal PH2 is utilized when the stage NSG is an odd-numbered stage.

The second clock signal PH2 is out-of-phase and non-overlapping with the first clock signal PH1. In addition, both clock signals PH1 and PH2 alternate between a logic high voltage level such as the power supply voltage VCC, and a logic low voltage level such as ground (the logic low level can also be negative).

Stages NSG1–NSGn are connected together so that, with the exception of the last stage NSGn, the drains of the bottom and top transistors NBT and NTT in each stage NSG are connected to the sources of the bottom and top transistors NBT and NTT, respectively, in an adjacent stage NSG. In addition, the sources of both the bottom and top transistors NBT1 and NTT1 in the first stage NSG1 are connected to receive the input voltage VIN (such as the power supply voltage VCC). Further, the drains of the bottom and top transistors NBTn and NTTn in the last stage NSGn output a pumped bottom voltage NPBV, and a pumped top voltage NPTV, respectively.

The operation of charge pump 600 is illustrated with a two-stage charge pump. When the clock signal PH1 rises to the logic high voltage level, a logic high potential approximately equal to the logic high voltage level is capacitively coupled to the drain of bottom transistor NBT1. Due to the cross coupling, the logic high potential is also coupled to the gate of top transistor NTT1. When the clock signal PH2 falls to the logic low voltage level, a logic low potential approximately equal to the logic low voltage level is capacitively coupled to the drain of top transistor NTT1, and to the gate of bottom transistor NBT1.

In this condition, the gate-to-source voltage of bottom transistor NBT1 is less (more negative) than the threshold voltage (which is negative) of bottom transistor NBT1. As a result, bottom transistor NBT1 turns on and the voltage on the drain of bottom transistor NBT1 rises to that of input voltage VIN. The gate-to-source voltage of top transistor NTT1, on the other hand, is greater than the threshold voltage of top transistor NTT1. As a result, top transistor NTT1 is turned off and the voltage on its drain resides at the logic low voltage level.

When the clock signal PH2 switches back to the logic high voltage level from the logic low voltage level, the logic high potential is capacitively coupled to the drain of top transistor NTT1. Due to the cross coupling, the logic high potential is also coupled to the gate of bottom transistor NBT1. When the clock signal PH1 falls to the logic low voltage level, the logic low potential is capacitively coupled to the drain of bottom transistor NBT1.

However, since a voltage equal to the value of input voltage VIN is already on the drain of bottom transistor NBT1, the capacitively coupled logic low potential reduces the potential on the drain of bottom transistor NBT1. The potential is reduced by the difference between the logic low potential and the logic high potential. However, since in most cases, the logic high potential and the input voltage VIN equal the supply voltage VCC, the drain voltage is reduced to zero.

Due to the cross coupling, this same zero potential also sits on the gate of top transistor NTT1, and thus, passes the input voltage VIN onto the drain of top transistor NTT1. Therefore, voltages on the drains of the bottom and top transistors NBT1 and NTT1 in stage NSG1 oscillate between VIN and ground.

In stage NSG2, when the clock signal PH1 switches to the logic low voltage level from the logic high level, the logic low potential is capacitively coupled to the drain of top transistor NTT2. This decreases the potential on the drain by an amount equal to the difference between the logic high and the logic low voltages. Due to cross coupling, this voltage is coupled to the gate of bottom transistor NBT2 and, thus, makes the bottom transistor NBT2 conduct because the gate-to-drain voltage is lower than the threshold voltage of the p-channel transistor NBT2. (The source and drain of a MOS transistor are reversible and, in this instance, the drain of bottom transistor NBT2 functions as a source.) The clock signal PH2, meanwhile, is at a logic high level. This gets coupled onto the drain of bottom transistor NBT2. As a result, the voltage on this node rises but because of the capacitively coupled low voltage on the gate of transistor NBT2, the transistor conducts, and thus, limits the voltage on the drain of transistor NBT2.

The voltage on the drain of the transistor NBT2 can reach a maximum value that equals the absolute value of the threshold voltage of the PMOS transistor. This voltage is reached when the capacitively coupled low voltage on the gate of the transistor is assumed to be zero, in which case, the PMOS transistor NBT2 acts like a diode because of zero voltages on both the drain (acting as a source) and gate. However, when the clock signal PH2 switches to a logic low level in the next cycle, the logic low potential gets capacitively coupled to the drain of the bottom transistor NBT2. This drops the potential on the drain of bottom transistor NBT2 by an amount equal to the difference between the logic high and the logic low voltages, and makes the voltage reach a negative value as this difference is usually greater than the absolute value of the threshold voltage of the p-channel transistor.

Due to cross coupling, the negative voltage on the drain of bottom transistor NBT2 sits on the gate of top transistor NTT2. When the clock signal PH2 is at a logic low state, the voltage on the drain of top transistor NTT2 equals zero and this value gets passed on to its drain because of the sufficiently low negative voltage on the gate of top transistor NTT2. Meanwhile, the clock signal PH1 is at a logic high state and when this gets down to logic low state, it pulls down the zero voltage on the drain of top transistor NTT2 to a value that equals the difference between the logic low and the logic high voltages.

By a similar process, the negative voltage on the drain of top transistor NTT2 causes a zero voltage to be passed to the drain of bottom transistor NBT2 which, in the next cycle, gets reduced to a negative value that equals the difference between the logic low and the logic high voltages. In most cases, the logic low voltage is the same as the ground voltage and the logic high voltage equals the same value as the input voltage VIN. Thus, as the first clock signal PH1 switches between the logic high voltage level and the logic low voltage level, the final predischarge potential on the drain of top transistor NTT2 switches between zero voltage and the negative voltage –VIN. Similarly, as the second clock signal PH2 switches between the logic high voltage level and the logic low voltage level, the final potential on the drain of bottom transistor NBT2 switches between zero voltage and the negative voltage –VIN. Thus, in accordance with the present invention, charge pump 600 provides pumped negative voltages that are not affected by the threshold voltages of the pumping transistors.

When a stage is added, the adjoining bottom transistors are switched on and off out-of-phase so that when one transistor is on, the adjoining transistors are off. This allows the lowest potential from one stage to become the highest potential of the next stage in the series. Thus, the final predischarge potential on the drain of the bottom transistor NBT in a next stage switches between the lowest potential that is on the drain of the bottom transistor NBT in the previous stage, and this potential minus the difference between the logic high and the logic low potentials.

Similarly, the adjoining top transistors are switched on and off out-of-phase so that when one transistor is on, the adjoining transistors are off. This allows the lowest potential from one stage to become the highest potential of the next stage in the series. Thus, the final predischarge potential on the top transistor NTT in a next stage switches between the lowest potential that is on the top transistor NTT in the previous stage, and this potential minus the difference between the logic high and the logic low potentials.

For n stages, the final potential on the drain of the bottom transistor of the nth stage switches between the input voltage VIN minus n–1 times the difference between the logic high and the logic low potential; and the input voltage minus n times the difference between the logic high and the logic low potentials. Similarly, the final potential on the drain of the top transistor of the nth stage switches between the input voltage VIN minus n–1 times the difference between the logic high and the logic low potentials, and the input voltage minus n times the difference between the logic high and the logic low potentials.

Figure 7:
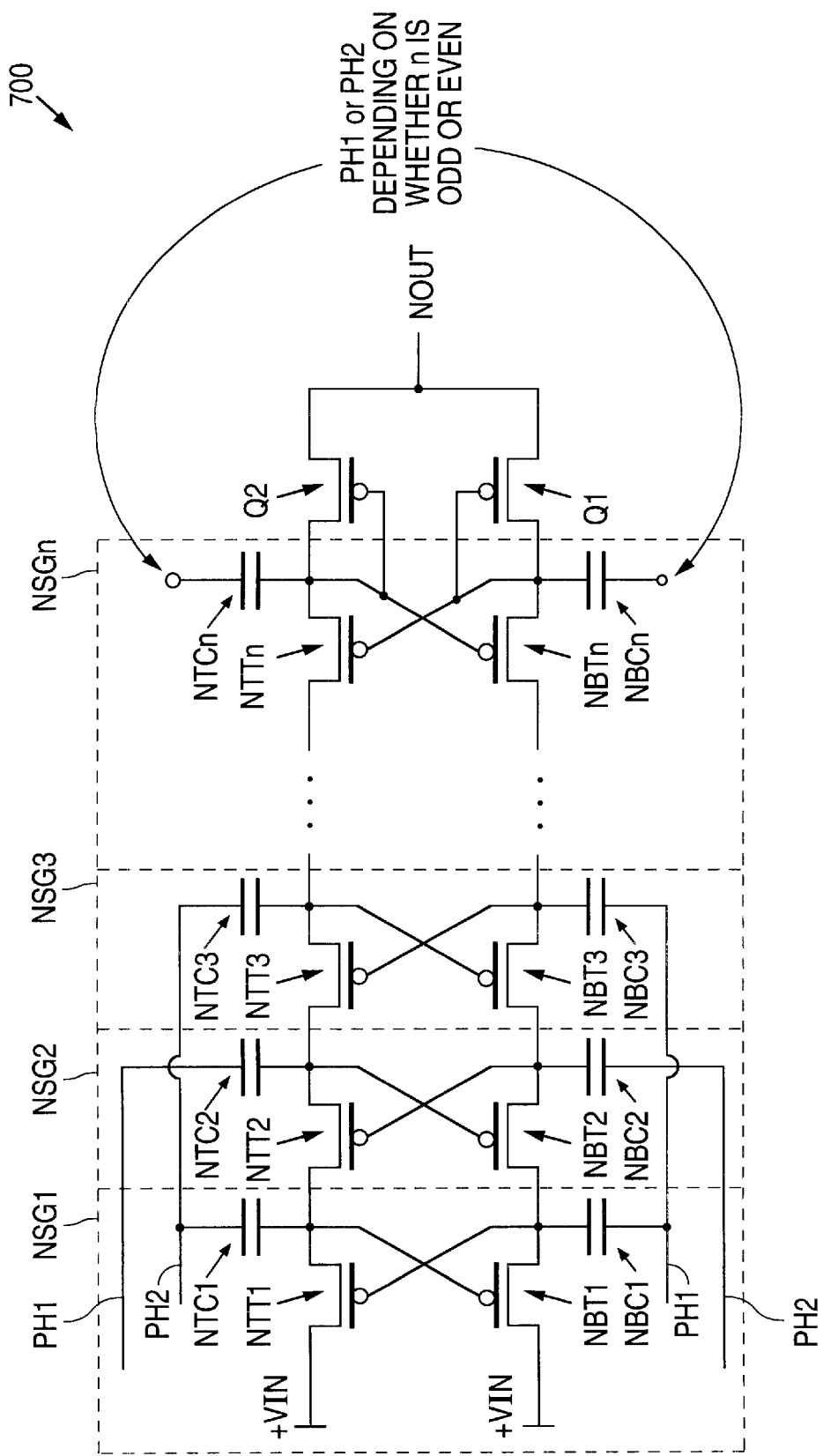
FIG. 7 is a schematic diagram illustrating a charge pump 700 in accordance with the present invention.

FIG. 7 shows a schematic diagram that illustrates a charge pump 700 in accordance with the present invention. Charge pump 700 is similar to charge pump 600 and, as a result, utilizes the same reference numerals to designate the structures that are common to both pumps.

As shown in FIG. 7, pump 700 differs from pump 600 in that pump 700 includes a first p-channel diode-connected transistor PT1 and a second p-channel diode-connected transistor PT2 that are connected as transistors DT1 and DT2. In operation, the voltage on the source of transistor PT1 has an approximately square waveform that switches between first and second voltages. The first voltage is equal to the input voltage VIN minus n–1 times the difference between the logic high and the logic low potentials plus the absolute value of the threshold voltage of transistor PT1. The second voltage is equal to the input voltage minus n times the difference between the logic high and the logic low potentials plus the absolute value of the threshold voltage of transistor PT1.

Similarly, the voltage on the source of transistor PT2 has an approximately square waveform that switches between first and second voltages. The first voltage is equal to the input voltage VIN minus n–1 times the difference between the logic high and the logic low potentials plus the absolute value of the threshold voltage of transistor PT2. The second voltage is equal to the input voltage minus n times the difference between the logic high and the logic low potentials plus the absolute value of the threshold voltage of transistor PT2.

The voltages on the sources of transistors PT1 and PT2 are 180° out-of-phase such that the first voltage on the source of transistor PT1 and the second voltage on the source of transistor PT2 are present at the same time. As a result, an approximately constant negative voltage equal to the negative voltage –VIN minus n times the logic low potential plus the absolute value of the threshold voltage of transistor PT1 (the threshold voltages of transistors PT1 and PT2 are assumed to be the same) is present on the output node NOUT.

Figure 8:
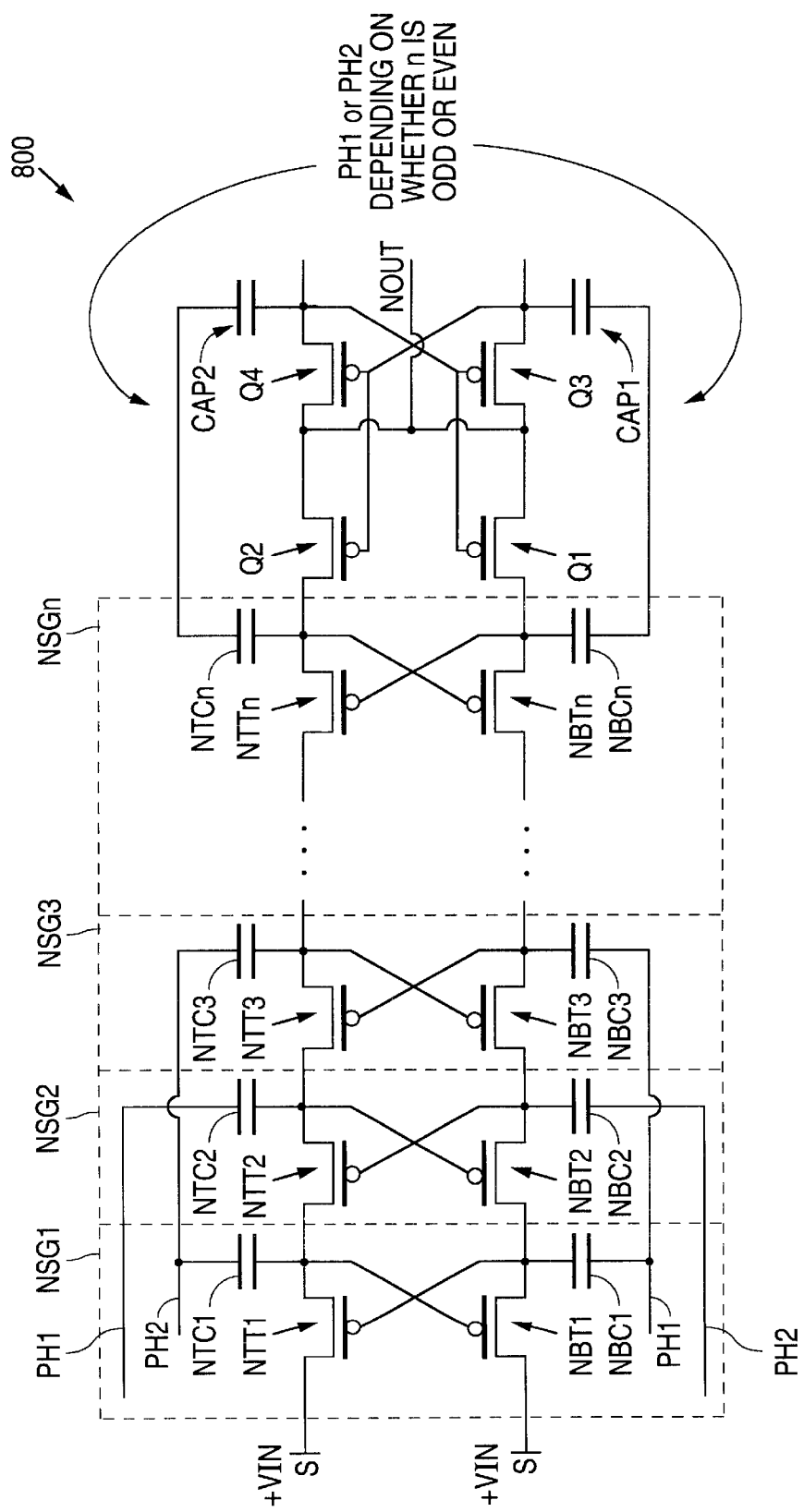
FIG. 8 is a schematic diagram illustrating a charge pump 800 in accordance with the present invention.

FIG. 8 shows a schematic diagram that illustrates a charge pump 800 in accordance with the present invention. Charge pump 800 is similar to charge pump 600, as a result, utilizes the same reference numerals to designate the structures that are common to both pumps.

As shown in FIG. 8, pump 800 differs from pump 600 in that pump 800 includes a p-channel first transistor Q1 and a p-channel second transistor Q2. First transistor Q1 has a source connected to the drain of the bottom transistor NBTn in the last stage NSGn, a gate, and a drain connected to an output node NOUT. Second transistor Q2 has a source connected to the drain of the top transistor NTTn in the last stage NSGn, a gate, and a drain connected to the output node NOUT.

Pump 800 also includes a third n-channel transistor Q3 and a fourth n-channel transistor Q4. Third transistor Q3 has a source connected to the drain of transistor Q1 and the output node NOUT, a gate connected to the gate of transistor Q1, and a drain. Fourth transistor Q4 has a source connected to the drain of transistor Q2 and the output node NOUT, a gate connected to the gate of transistor Q2 and the drain of transistor Q3, and a drain connected to the gate of transistor Q3.

Pump 800 additionally includes a bottom capacitor CAP1 and a top capacitor CAP2. Bottom capacitor CAP1 is connected between the drain of transistor Q3 and the clock signal that is the same as the clock signal that is connected to the top capacitor NTCn in the last stage NSGn. Top capacitor CAP2 is connected between the drain of transistor Q4 and the clock signal that is the same as the clock signal that is connected to the bottom capacitor NBCn in the last stage NSGn. Bottom and top capacitors CAP1 and CAP2 can be, for example, about one-tenth as large as the bottom and top capacitors NBC and NTC.

In operation, the voltages on the drains of transistors Q3 and Q4 are pumped down in the same way as if transistors Q3 and Q4 were the bottom and top transistors NBT and NTT of another stage NSG. Thus, the final potentials on the drains of transistors Q3 and Q4 switch between the input voltage VIN minus n−1 times the difference between the logic high and the logic low potentials; and the input voltage VIN minus n times the difference between the logic high and the logic low potentials. As a result, the lowest final potentials on the drains of transistors Q3 and Q4 are both lower than the lowest final potentials on the drains of the bottom and top transistors NBT and NTT of the last stage NSGn by the difference between the logic high and the logic low potentials.

Due to the cross coupling, when the potential on the drain of the bottom transistor of the last stage NSGn switches to its lowest potential, the voltage on the gates of transistors Q1 and Q3 also switches to its lowest potential. This, in turn, causes the potential on the output node NOUT to fall to the lowest potential that is on the drain of the bottom transistor NBTn of the last stage NSGn.

Similarly, when the potential on the drain of the top transistor of the last stage NSGn switches to its lowest potential, the voltage on the gates of transistors Q2 and Q4 also switches to its lowest potential. This, in turn, causes the potential on the output node NOUT to fall to the lowest potential that is on the drain of the bottom transistor NBTn of the last stage NSGn.

The voltage on the drain of transistor Q1 has an approximately square waveform that switches between first and second voltages. The first voltage is equal to the input voltage VIN minus n−1 times the difference between the logic high and the logic low potentials. The second voltage is equal to the input voltage minus n times the difference between the logic high and the logic low potentials.

Similarly, the voltage on the drain of transistor Q2 has an approximately square waveform that switches between first and second voltages. The first voltage is equal to the input voltage VIN minus n−1 times the difference between the logic high and the logic low potentials. The second voltage is equal to the input voltage minus n times the difference between the logic high and the logic low potentials.

The voltages on the drains of transistors Q1 and Q2 are 180° out-of-phase such that the first voltage on the drain of transistor Q1 and the second voltage on the drain of transistor Q2 are present at the same time. As a result, an approximately constant voltage equal to the input voltage VIN minus n times the difference between the logic high and the logic low potentials is present on the output node NOUT.

Figure 9:
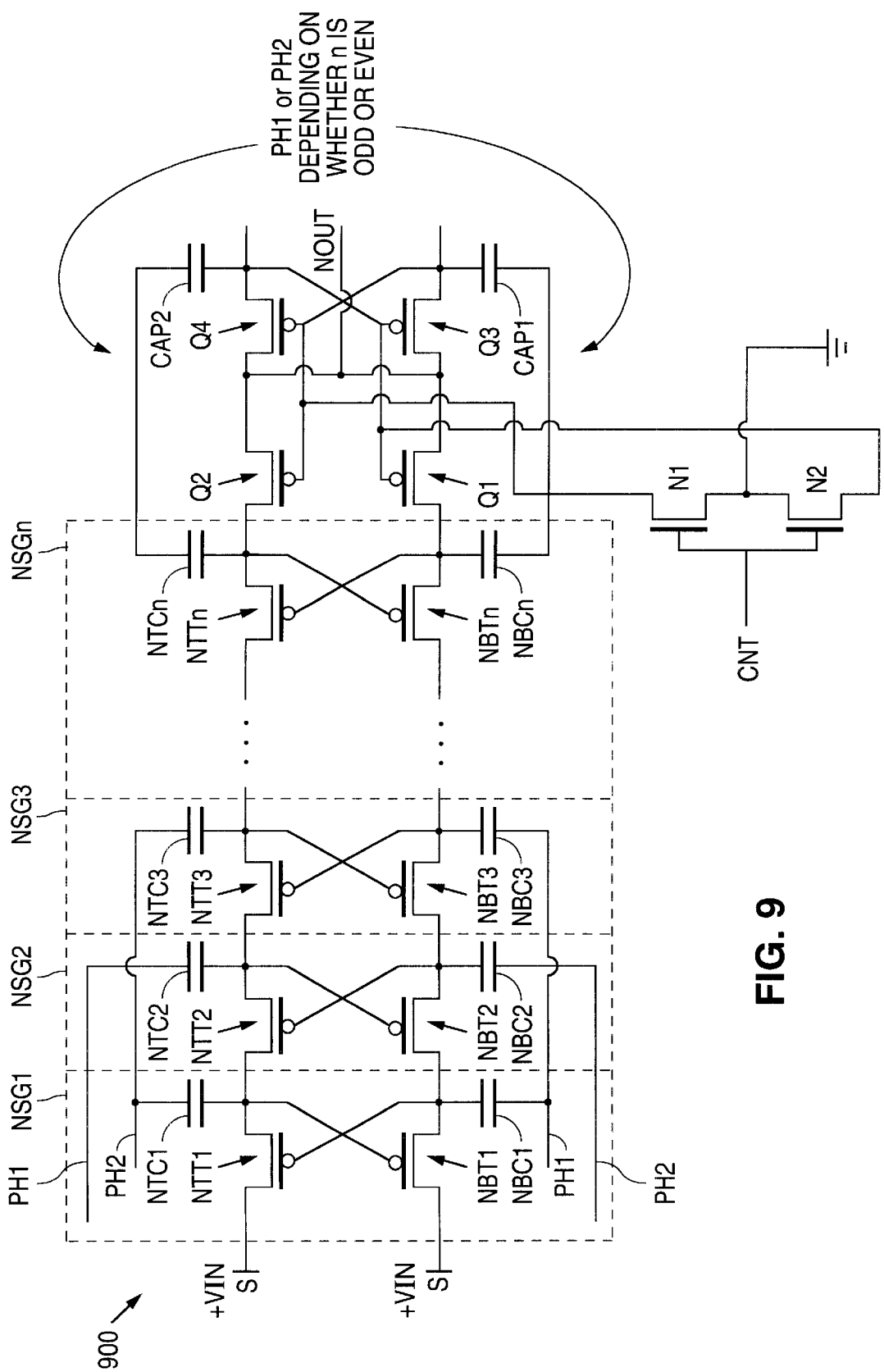
FIG. 9 is a schematic diagram illustrating a charge pump 900 in accordance with the present invention.

FIG. 9 shows a schematic diagram that illustrates a charge pump 900 in accordance with the present invention. Charge pump 900 is similar to charge pump 800 and, as a result, utilizes the same reference numerals to designate the structures that are common to both pumps.

As shown in FIG. 9, pump 900 differs from pump 800 in that pump 900 includes a pair of p-channel transistors P1 and P2 that are used to enable or disable pump 900. Transistor P1 has a drain connected to the gate of transistor Q2, a gate connected to receive a control signal CNT, and a source connected to a supply voltage VCC. Transistor P2 has a drain connected to the gate of transistor Q1, a gate connected to receive the control signal CNT, and a source connected to the supply voltage VCC. In operation, when the control signal is at a logic high potential, equal to that of the supply voltage VCC, the gates of the transistors Q1–Q4 are unaffected by transistors N1 and N2, and thus, enable the pump to operate normally. However, when the control signal CNT is low, the gates of transistors Q1–Q4 are pulled to the supply voltage VCC, thereby turning transistors Q1–Q4, and as a result, the whole pump off.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A charge pump comprising:
   a plurality of stages connected together in series, each stage having:
      a bottom transistor having a first node, a gate, and a second node;
      a top transistor having a first node, a gate connected to the second node of the bottom transistor, and a second node connected to the gate of the bottom transistor;
      a bottom capacitor connected between the second node of the bottom transistor and either a first clock signal or a second clock signal, the first clock signal being connected when a stage is an odd-numbered stage, the second clock signal being connected when a stage is an even-numbered stage; and
      a top capacitor connected between the second node of the top transistor and either the first clock signal or the second clock signal, the first clock signal being connected when a stage is an even-numbered stage, the second clock signal being connected when a stage is an odd-numbered stage, the second clock signal being out-of-phase and non-overlapping with the first clock signal,
   the plurality of stages being connected together so that, excluding a last stage, the second nodes of the bottom and top transistors in each stage are connected to the first nodes of the bottom and top transistors, respectively, in an adjacent stage, and so that, excluding a first stage, the first nodes of the bottom and top transistors in each stage are connected to the second nodes of the bottom and top transistors, respectively, in an adjacent stage.

2. The pump of claim 1 wherein the bottom and top transistors are n-channel transistors, the first nodes of the bottom and top transistors are drains, and the drain of the first stage is connected to receive an input voltage.

3. The pump of claim 2 wherein the input voltage is a positive voltage, and the first and second clock signals alternate between a positive logic high voltage level, and a logic low voltage level.

4. The pump of claim 2 wherein the input voltage is a positive voltage, and the first and second clock signals alternate between a positive logic high voltage level, and a negative logic low voltage level.

5. The pump of claim 1 wherein the bottom and top transistors are p-channel transistors, the first nodes of the bottom and top transistors are sources, and the source of the first stage is connected to receive an input voltage.

6. The pump of claim 5 wherein the input voltage is a positive voltage, and the first and second clock signals alternate between a positive logic high voltage level, and a logic low voltage level.

7. The pump of claim 1 and further comprising:
   a first diode-connected transistor having a first node and a gate connected to the second node of the top transistor in a last stage, and a second node connected to an output node; and
   a second diode-connected transistor having a first node and a gate connected to the second node of the bottom transistor in the last stage, and a second node connected to the output node.

8. The pump of claim 7 wherein the first and second diode-connected transistors are n-channel transistors, and the first nodes of the first and second diode-connected transistors are drains.

9. The pump of claim 7 wherein the first and second diode-connected transistors are p-channel transistors, and the first nodes of the first and second diode-connected transistors are sources.

10. The pump of claim 1 and further comprising:
a first transistor having a drain connected to the second node of the bottom transistor in the last stage, a gate, and a source connected to an output node;
a second transistor having a drain connected to the second node of the top transistor in the last stage, a gate, and a source connected to the output node;
a third transistor having a drain connected to the source of the first transistor and the output node, a gate connected to the gate of the first transistor, and a source;
a fourth transistor having a drain connected to the source of the second transistor and the output node, a gate connected to the gate of the second transistor and the source of the third transistor, and a source connected to the gate of third transistor;
a bottom capacitor connected between the source of the third transistor and a clock signal that is the same as the clock signal that is connected to the top capacitor in the last stage; and
a top capacitor connected between the source of the fourth transistor and a clock signal that is the same as the clock signal that is connected to the bottom capacitor in the last stage.

11. The pump of claim 10 and further comprising:
a fifth transistor having a drain connected to the gates of the second and fourth transistors, a gate, and a source connected to ground; and
a sixth transistor having a drain connected to the gates of the first and third transistors, a gate, and a source connected to ground.

12. The stage of claim 1 and further comprising:
a first transistor having a source connected to the second node of the bottom transistor in the last stage, a gate, and a drain connected to an output node;
a second transistor having a source connected to the second node of the top transistor in the last stage, a gate, and a drain connected to the output node;
a third transistor having a source connected to the drain of the first transistor and the output node, a gate connected to the gate of the first transistor, and a drain;
a fourth transistor having a source connected to the drain of the second transistor and the output node, a gate connected to the gate of the second transistor and the drain of the third transistor, and a drain connected to the gate of third transistor;
a bottom capacitor connected between the drain of the third transistor and a clock signal that is the same as the clock signal that is connected to the top capacitor in the last stage; and
a top capacitor connected between the drain of the fourth transistor and a clock signal that is the same as the clock signal that is connected to the bottom capacitor in the last stage.

13. The pump of claim 12 and further comprising:
a fifth transistor having a drain connected to the gates of the second and fourth transistors, a gate, and a source connected to a power supply voltage; and
a sixth transistor having a drain connected to the gates of the first and third transistors, a gate, and a source connected to the power supply voltage.

14. A method for operating a charge pump, the charge pump comprising:
a plurality of stages connected together in series, each stage having:
a bottom transistor having a first node, a gate, and a second node;
a top transistor having a first node, a gate connected to the second node of the bottom transistor, and a second node connected to the gate of the bottom transistor;
a bottom capacitor having a first plate and a second plate, the first plate being connected to the second node of the bottom transistor; and
a top capacitor having a first plate and a second plate, the first plate being connected to the second node of the top transistor,
the plurality of stages being connected together so that, excluding a last stage, the second nodes of the bottom and top transistors in each stage are connected to the first nodes of the bottom and top transistors, respectively, in an adjacent stage, and so that, excluding a first stage, the first nodes of the bottom and top transistors in each stage are connected to the second nodes of the bottom and top transistors, respectively, in an adjacent stage;
the method comprising the steps of:
applying a first clock signal to the second plate of each odd numbered bottom transistor;
applying a second clock signal to the second plate of each even numbered bottom transistor;
applying the first clock signal to the second plate of each even numbered top transistor; and
applying the second clock signal to the second plate of each odd numbered top transistor, the second clock signal being out-of-phase and non-overlapping with the first clock signal, the second clock signal being out-of-phase and non-overlapping with the first clock signal.

15. The pump of claim 14 and further comprising:
a first diode-connected transistor having a first node and a gate connected to the second node of the top transistor in a last stage, and a second node connected to an output node; and
a second diode-connected transistor having a first node and a gate connected to the second node of the bottom transistor in the last stage, and a second node connected to the output node.

16. The pump of claim 14 and further comprising:
a first transistor having a drain connected to the second node of the bottom transistor in the last stage, a gate, and a source connected to an output node;
a second transistor having a drain connected to the second node of the top transistor in the last stage, a gate, and a source connected to the output node;
a third transistor having a drain connected to the source of the first transistor and the output node, a gate connected to the gate of the first transistor, and a source;
a fourth transistor having a drain connected to the source of the second transistor and the output node, a gate connected to the gate of the second transistor and the source of the third transistor, and a source connected to the gate of third transistor;
a bottom capacitor connected between the source of the third transistor and a clock signal that is the same as the clock signal that is connected to the top capacitor in the last stage; and a top capacitor connected between the source of the fourth transistor and a clock signal that is the same as the clock signal that is connected to the bottom capacitor in the last stage.

17. The stage of claim 14 and further comprising:

a first transistor having a source connected to the second node of the bottom transistor in the last stage, a gate, and a drain connected to an output node;

a second transistor having a source connected to the second node of the top transistor in the last stage, a gate, and a drain connected to the output node;

a third transistor having a source connected to the drain of the first transistor and the output node, a gate connected to the gate of the first transistor, and a drain;

a fourth transistor having a source connected to the drain of the second transistor and the output node, a gate connected to the gate of the second transistor and the drain of the third transistor, and a drain connected to the gate of third transistor;

a bottom capacitor connected between the drain of the third transistor and a clock signal that is the same as the clock signal that is connected to the top capacitor in the last stage; and a top capacitor connected between the drain of the fourth transistor and a clock signal that is the same as the clock signal that is connected to the bottom capacitor in the last stage.

* * * * *